April 6, 1965 E. P. SIMONIAN ETAL 3,177,374
BINARY DATA TRANSFER CIRCUIT
Filed March 10, 1961
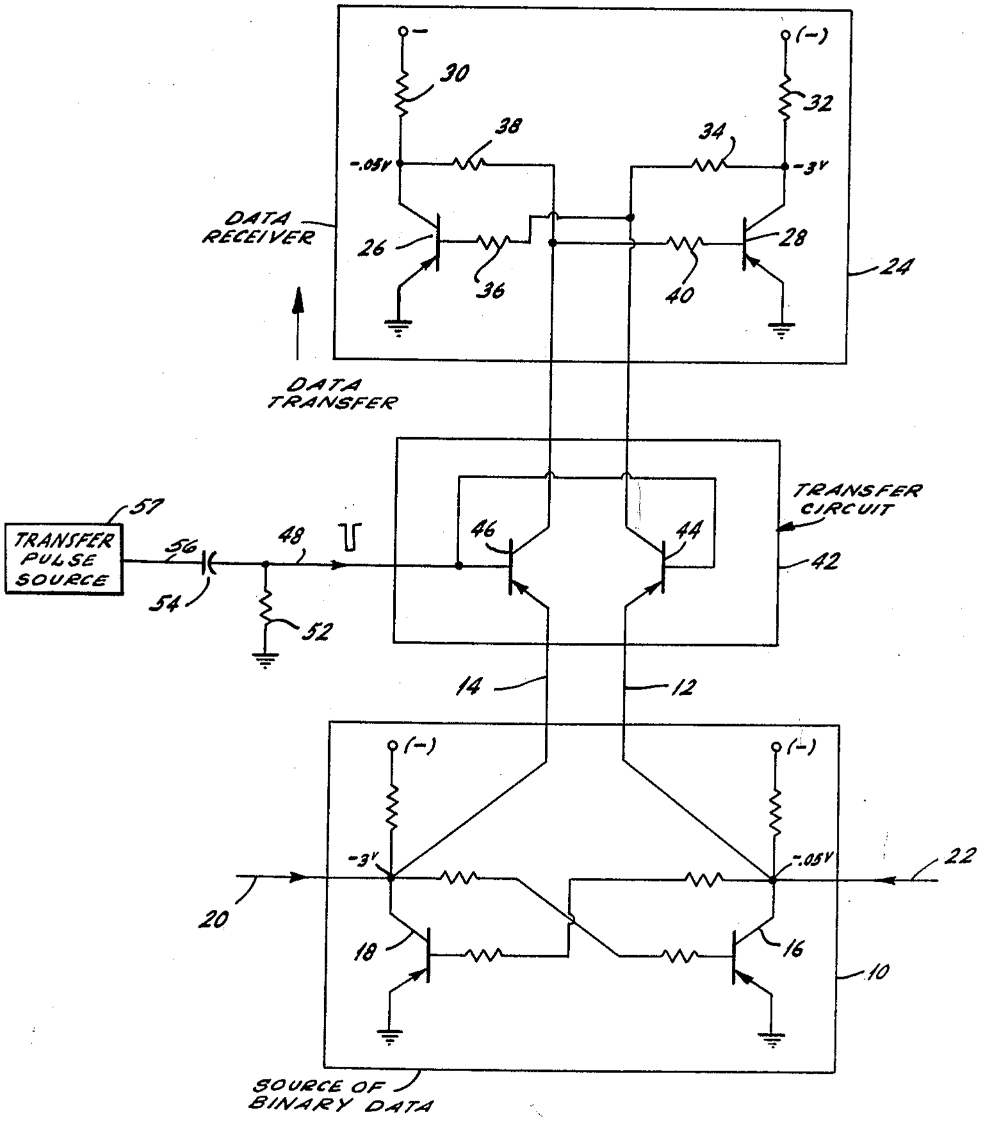
INVENTORS
EDWARD P. SIMONIAN
EUGENE GOLDBERG
BY
Robert D. Sanborn
ATTORNEY United States Patent Office 3,177,374

Patented Apr. 6, 1965

3,177,374

BINARY DATA TRANSFER CIRCUIT

Edward P. Simonian, Oak Harbor, Wash., and Eugene Goldberg, Philadelphia, Pa., assignors, by mesne assignments, to Philco Corporation, Philadelphia, Pa., a corporation of Delaware Filed Mar. 10, 1961, Ser. No. 94,788
6 Claims. (Cl. 307—88.5)

The present invention relates to data transfer circuits and more particularly to circuits for accomplishing the jam transfer of data from one register element to another.

Bistable multivibrators or "flip-flop" circuits are widely used in digital computers as register elements. Since flip-flop circuits have two stable states, one stable state may be selected to represent the digit "one" and the other state selected to represent the digit "zero." In transferring data from one section of a computer to another it is necessary to set a flip-flop circiut in the data receiving section to the same condition or state as the corresponding flip-flop circuit in the data transmitting section. In accordance with one system currently employed in computer circuits, the data receiving flip-flop circuit is first set or "cleared" to a preselected state. A signal is then coupled from one side of the source flip-flop circuit to one side of the receiving flip-flop circuit. If the source flip-flop circuit is in a condition corresponding to the preset set state of the receiving flip-flop circuit, no change in the condition of the second flip-flop circuit occurs. However if the source flip-flop circuit is in a different state than that of the preset condition of the receiving flip-flop circuit, the signal supplied by the source flip-flop circuit to the receiving flip-flop circuit changes the state of the receiving flip-flop circuit. This system thus requires the steps of clearing or presetting the receiving flip-flop circuit and then transferring "ones" or "zeros" only. It has the advantage of reliability but has the disadvantage that relatively large amounts of equipment and relatively long times are required for transfer.

In accordance with another system sometimes employed in computers, no clearing or presetting of the receiving flip-flop circuit is required. Instead, signals from both sides of the source flip-flop circuit are connected to the receiving flip-flop circuit to force it into a state corresponding to that of the source flip-flop circuit. This system is known in the computer art as jam transfer of data. The jam transfer of data into a two-transistor flip-flop circuit has been accomplished in the past by connecting a trigger transistor in shunt with each of the two transistors of the flip-flop circuit. One side of the data source is connected to the base of one of the trigger transistors and the other side of the source is connected to the base of the other trigger transistor. Transfer signals are supplied to the emitters of the two trigger transistors. This is usually accomplished by connecting the emitters of the two trigger transistors to the collector of a third transistor, the emitter of which is at a fixed reference potential, for example ground. The transfer pulse is supplied to the base of this third transistor. This system is subject to several disadvantages. If the third transfer transistor is employed, three transistors are required for each bit of data transferred. If the third or transfer transistor is omitted and the emitters of the two trigger transfer resistors are supplied directly from the source of transfer pulses, relatively large amounts of transfer power are required. Also, in systems employing a large number of registers and associated switching circuits, there is the possibility of sneak paths which may lead to false information being transferred to the receiver flip-flop circuit.

It is an object of the present invention to provide a novel binary data transfer system which requires very little transfer power, a minimum of circuit elements and is free of sneak paths. In general, this is accomplished by employing a conventional two-transistor flip-flop circuit which includes resistive coupling networks from the collector of each transistor to the base of the opposite transistor. Only two switching transistors are employed. One terminal of the emitter-collector path of each of the switching transistors is connected to an intermediate tap of a respective one of the coupling networks of the storage flip-flop circuit. The complementary outputs of the source are connected to the other terminals of the emitter-collector paths of the first and second switching transistors, respectively, and a common trigger pulse is supplied to the base of the two switching transistors.

For a better understanding of the present invention together with other and further objects thereof, reference should now be had to the following detailed description which is to be read in conjunction with the accompanying drawing wherein the sole figure is a schematic diagram of the preferred embodiment of the present invention.

In the drawing, the circuit within the block 10 represents a source of binary data. Source 10 has two output leads 12 and 14. Each of the leads 12 or 14 may assume either one of two different potentials. If lead 12 is at one potential, then lead 14 will be at the other potential. The means for causing leads 12 and 14 to assume these different potentials is not a part of the present invention. However by way of illustration, it is assumed that lead 12 is connected to the collector of a transistor 16 and that lead 14 is connected to the collector of a second transistor 18, the transistors 16 and 18 being connected together in a conventional resistor coupled flip-flop circuit. Input connections 20 and 22 are provided for setting source 10 into a selected one of its two stable states.

The circuit within the block 24 comprises the storage element which is to be set on command to register the same information as that supplied by source 10. Circuit 24 includes two transistors 26 and 28 connected in a grounded-emitter configuration. Transistor 26 has a resistor 30 connected from the collector to a source of bias potential schematically represented by the minus sign. Similarly a resistor 32 is connected between the collector of transistor 28 and a source of bias potential represented by a second minus sign. Usually resistors 30 and 32 will be connected to the same source of bias potential. The collector of transistor 28 is connected to the base of transistor 26 by way of the resistor network 34–36. The collector of transistor 26 is connected to the base of transistor 28 by way of resistor network 38–40 to complete the bistable circuit. The transfer circuit included within block 42 comprises a first transistor 44, the collector of which is connected to the junction of resistors 34 and 36 and the emitter of which is connected to the output connection 12 of the source. The collector of a second transfer transistor 46 is connected to the junction of resistors 38 and 40 while the emitter of this transistor 46 is connected to output connection 14 of source 10. A connection 48 provides means for supplying negative transfer pulses from a suitable source represented schematically by transfer bus 56, block 57 and the resistor-capacitor coupling network 52–54 to the bases of transistors 44 and 46, respectively. It may be assumed by way of example that all transistors shown in the drawing are of the same type, that all resistors have equal value, for example 1,000 ohms, and that the same bias potential, for example three volts, is supplied to the four amplifier stages which are cross-coupled to make the two bistable circuits 10 and 24, respectively. It is to be understood that this is by way of example only and that the invention is not limited to this particular choice of values.

The circuit shown in the drawing operates in the following manner. In the absence of a negative transfer signal on input line 56, there will be no connection between either of the output lines 12 and 14 and bistable circuit 24. Therefore the condition or state of source 10 may be changed at will by signals supplied to inputs 20 and/or 22 without affecting the information stored in circuit 24. The state of conduction of flip-flop circuit 24 will depend upon the previous operating history of the circuit. One or the other of transistors 26 or 28 will be conducting but not both. If now a negative transfer pulse is supplied by way of input connection 56 and coupling network 52–54 to the bases of transistors 44 and 46, respectively, the state of conduction of transistor 28 will be made to correspond to the state of conduction of transistor 16 and the state of conduction of transistor 26 will be made to correspond to the state of conduction of transistor 18. Thus receiver circuit 24 will be set to the same condition as source 10. Termination of the transfer signal on lead 56 will again isolate receiver 24 from source 10.

Again a specific example will be chosen to further illustrate the operation of this circuit. Let it be assumed that transistor 26 is conducting so that the collector thereof is near ground potential, for example at —.05 volt, and that transistor 28 is non-conducting so that the collector thereof is at a potential of the source, for example —3 volts. Let it be assumed further that transistor 16 is conducting, placing the collector of this transistor at near ground, for example —.05 volt, and that transistor 18 is non-conducting so that the collector thereof is at —3 volts. If a negative transfer pulse having a duration of say 10 microseconds and an amplitude of .5 volt is supplied to transfer lead 56, transistor 44 will be made conducting owing to the fact that the base is negative with respect to the emitter by approximately .5 volt. Since transistor 44 is conducting, this will place the base of transistor 26 at approximately the potential of the collector of transistor 16 which in this instance is —.05 volt. Placing the base of transistor 26 at this potential cuts off this transistor and causes the collector voltage to rise to —3 volts. The —3 volts at the collector of transistor 26 is coupled by way of resistors 38 and 40 to the base of transistor 28 to turn this transistor on. With the transistor 28 turned on, the collector thereof is at approximately ground potential. The connection from the collector of transistor 28 to the base of transistor 26 by way of resistors 34 and 36 holds the transistor 26 in its cutoff state.

It will be seen that if the condition of both source 10 and receiver 24 were reversed at the time transfer pulse was supplied, the operation would be the same except that transistor 46 would conduct to cut off transistor 28.

If the condition of conduction of flip-flop circuit 24 is reversed but not that of source 10, so that source 24 is already registering the information supplied by source 10, transistor 44 will again conduct. However the base of transistor 26 will already be at ground potential, being held there by the conduction of transistor 28. Therefore operation of the transfer circuit 42 will not bring about any change in the condition of storage unit 24. Thus less time is required to transfer data in the system shown in the drawing than is required in systems in which receiving unit 24 is first cleared and then returned to its initial condition.

If greater speed of operation is required, the amplitude of the transfer pulse supplied to input 56 may be increased to the point where both transistors 44 and 46 will conduct for each transfer pulse. Returning to the original example, transistor 44 will again be rendered conductive by the transfer pulse supplied to the base thereof. This will place the base of transistor 26 at approximately ground potential, cutting off transistor 26. Simultaneously, transistor 46 will be rendered conductive placing the base of transistor 28 at —3 volts thus causing this transistor to conduct. Thus the resetting of transistors 26 and 28 in storage unit 24 occurs simultaneously rather than serially.

While the invention has been described with reference to the preferred embodiments thereof, it will be apparent that various modifications and other embodiments thereof will occur to those skilled in the art within the scope of the invention. Accordingly we desire the scope of our invention to be limited only by the appended claims.

What is claimed is:

1. In a computer circuit which includes a data source having first and second output terminals, each of which may assume a different one of two selected potentials to represent a unit of data, a data receiving element comprising first and second transistors each connected in a grounded emitter configuration, each transistor having a base, a collector and an emitter, a first collector impedance coupled to said collector of said first transistor, a second collector impedance coupled to said collector of said second transistor, a first resistive network coupled between the collector of said first transistor and the base of said second transistor and a second resistive network coupled between the collector of said second transistor and the base of said first transistor, and a data transfer circuit comprising third and fourth transistors each having a base, an emitter, a collector and an emitter-collector path between the emitter and collector thereof, means connecting the emitter-collector path of said third transistor between said first output terminal of said source, and an intermediate point on said first resistive network, means connecting the emitter-collector path of said fourth transistor between said second output terminal of said source and an intermediate point on said second resistive network, and means coupled to the bases of said third and fourth transistors for supplying short duration transfer pulses thereto.

2. In a computer circuit which includes a data source having first and second output terminals, each of which may assume a different one of two selected potentials to represent a unit of data, a data receiving element comprising first and second transistors each connected in a grounded emitter configuration, each transistor having a base, a collector and an emitter, a first collector impedance coupled to said collector of said first transistor, a second collector impedance coupled to said collector of said second transistor, a first resistive network coupled between the collector of said first transistor and the base of said second transistor and a second resistive network coupled between the collector of said second transistor and the base of said first transistor, and a data transfer circuit consisting of a third transistor having a base, an emitter and a collector, the emitter of which is connected to said first output terminal of said source and the collector of which is connected to an intermediate point on said first resistive network, a fourth transistor having a base, an emitter and a collector, the emitter of which is connected to said second output terminal of said source and the collector of which is connected to an intermediate point on said second resistive network, and means coupled to the bases of said third and fourth transistors for supplying short duration transfer pulses thereto.

3. A circuit in accordance with claim 2 wherein said collectors of said third and fourth transistors are connected to the midpoints of said first and second resistive networks, respectively.

4. A circuit in accordance with claim 2 wherein said means coupled to the bases of said third and fourth transistors is so constructed that pulses supplied to said bases of said third and fourth transistors are of sufficient amplitude to bias both of said third and fourth transistors to a condition which will permit conduction through said third and fourth transistors upon the application of said pulses.

5. In a computer or the like, first and second data register elements, each of said data register elements comprising a resistive coupled flip-flop circuit, each of said flip-flop circuits including first and second transistors connected in a grounded emitter configuration, each of said transistors having a base, a collector and an emitter, each of said transistors being provided with a collector impedance, each of said flip-flop circuits further including a first resistive network coupled between the collector of said first transistor and the base of said second transistor and a second resistive network coupled between the collector of said second transistor and the base of said first transistor, and a data transfer circuit for transferring data from a first one of said data register elements to a second one of said data register elements, said data transfer circuit consisting of a first coupling transistor having a base, an emitter and a collector, the emitter of which is coupled to the collector of said first transistor of said first data register element and the collector of which is connected to an intermediate point of said first resistive network of said second data register element and a second coupling transistor having a base, an emitter and a collector, the emitter of which is connected to the collector of said second transistor in said first data register element and the collector of which is connected to an intermediate point of said second resistive network in said second data register element, and means coupled to the bases of the said two coupling transistors of said data transfer circuit for supplying short duration transfer pulses thereto.

6. A circuit in accordance with claim 5 wherein said collector of said first coupling transistor is connected to the mid-point of said first resistive network of said second data register element and wherein said collector of said second coupling transistor is connected to the mid-point of said second resistive network in said second data register element.

References Cited by the Examiner

UNITED STATES PATENTS

| | | | |
|---|---|---|---|
| 2,785,304 | 3/57 | Bruce | 328—37 |
| 2,877,357 | 3/59 | Pearsall et al. | 307—88.5 |
| 2,959,691 | 11/60 | Zoerner | 307—88.5 |
| 2,982,867 | 5/61 | Wennerberg | 307—88.5 |
| 2,986,654 | 5/61 | Gunning | 307—88.5 |
| 2,997,605 | 8/61 | Fortini | 307—88.5 |
| 3,007,115 | 10/61 | Batley | 328—92 XR |
| 3,020,418 | 2/62 | Emile | 307—88.5 |

ARTHUR GAUSS, *Primary Examiner.*

HERMAN K. SAALBACH, *Examiner.*